(12) United States Patent
Chavez

(10) Patent No.: US 10,466,949 B2
(45) Date of Patent: Nov. 5, 2019

(54) BALLISTIC-RESISTANT COCKPIT DISPLAY

(71) Applicant: Bell Helicopter Textron Inc., Fort Worth, TX (US)

(72) Inventor: Jeremy R. Chavez, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 79 days.

(21) Appl. No.: 14/878,059

(22) Filed: Oct. 8, 2015

(65) Prior Publication Data

US 2017/0075639 A1    Mar. 16, 2017

Related U.S. Application Data

(60) Provisional application No. 62/218,300, filed on Sep. 14, 2015.

(51) Int. Cl.
| | |
|---|---|
| *G06F 3/14* | (2006.01) |
| *B64D 43/00* | (2006.01) |
| *G06F 3/147* | (2006.01) |
| *G09G 3/20* | (2006.01) |

(52) U.S. Cl.
CPC ........... *G06F 3/1423* (2013.01); *B64D 43/00* (2013.01); *G06F 3/147* (2013.01); *G09G 3/20* (2013.01); *G09G 2300/026* (2013.01); *G09G 2330/08* (2013.01); *G09G 2330/12* (2013.01); *G09G 2380/12* (2013.01)

(58) Field of Classification Search
CPC ....... G06F 3/1423; G06F 3/147; B64D 43/00; G09G 3/20; G09G 2300/026; G09G 2330/08; G09G 2330/12; G09G 2380/12
See application file for complete search history.

(56) References Cited

U.S. PATENT DOCUMENTS

| | | | | |
|---|---|---|---|---|
| 4,845,495 A | * | 7/1989 | Bollard | G05D 1/0077 340/945 |
| 6,112,140 A | * | 8/2000 | Hayes | G05D 1/0077 244/195 |
| 6,842,672 B1 | * | 1/2005 | Straub | G05D 1/0077 244/1 R |
| 7,190,390 B2 | * | 3/2007 | Hett | G02F 1/13336 348/58 |

(Continued)

*Primary Examiner* — Peter D McLoone
(74) *Attorney, Agent, or Firm* — Lightfoot & Alford PLLC

(57) ABSTRACT

According to one embodiment, a cockpit display system includes display tiles that together form a single, continuous display screen, a content generation unit configured to generate content instructions that instruct the display screen to display content comprising a plurality of information portions, a display feedback unit, and a content prioritization unit. Each information portion of the plurality of information portions is to be displayed on one or more display tiles of the plurality of display tiles. The display feedback unit is configured to detect a malfunction of one or more malfunctioning display tiles of the plurality of display tiles. The content prioritization unit is configured to instruct the content generation unit to generate updated content instructions. The updated content instructions move at least some of the information portions associated with the one or more malfunctioning display tiles to one or more display tiles that are not experiencing the malfunction.

20 Claims, 6 Drawing Sheets

(56) References Cited

U.S. PATENT DOCUMENTS

| | | | | |
|---|---|---|---|---|
| 7,307,549 | B2* | 12/2007 | Firra | B64D 43/00 340/971 |
| 7,808,403 | B2* | 10/2010 | Pouzolz | G01D 3/10 340/945 |
| 7,928,863 | B2* | 4/2011 | Firra | B64D 43/00 340/971 |
| 8,310,407 | B2* | 11/2012 | Keuenhof | G06F 19/321 345/1.2 |
| 8,373,614 | B2* | 2/2013 | Bigot | G06F 3/1423 345/1.1 |
| 8,570,192 | B2* | 10/2013 | McLoughlin | B64D 45/00 340/945 |
| 8,878,701 | B2* | 11/2014 | Firra | B64D 43/00 340/971 |
| 2002/0003592 | A1* | 1/2002 | Hett | G02F 1/13336 349/58 |
| 2008/0246633 | A1* | 10/2008 | Pouzolz | G01D 3/10 340/971 |
| 2014/0246537 | A1* | 9/2014 | Oltheten | B64C 27/008 244/17.11 |
| 2016/0125778 | A1* | 5/2016 | Antipa | G06F 3/1446 345/619 |

* cited by examiner

BALLISTIC-RESISTANT COCKPIT DISPLAY

RELATED APPLICATIONS

Pursuant to 35 U.S.C. § 119 (e), this application claims priority to U.S. Provisional Patent Application Ser. No. 62/218,300, entitled BALLISTIC-RESILIENT COCKPIT DISPLAY, filed Sep. 14, 2015. U.S. Provisional Patent Application Ser. No. 62/218,300 is hereby incorporated by reference.

GOVERNMENT RIGHTS

At least some of the subject matter of this application may have been made under W911W6-13-2-0001 awarded by the United States Army under the Future Vertical Lift program. The government may have certain rights in the invention.

TECHNICAL FIELD

This invention relates generally to cockpit display systems, and more particularly, to a ballistic-resilient cockpit display.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a single display with internal redundancy capability. A technical advantage of one embodiment may include the capability to have prioritized content and to relocate content based on the prioritization in response to sensed damage to a portion of the display.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
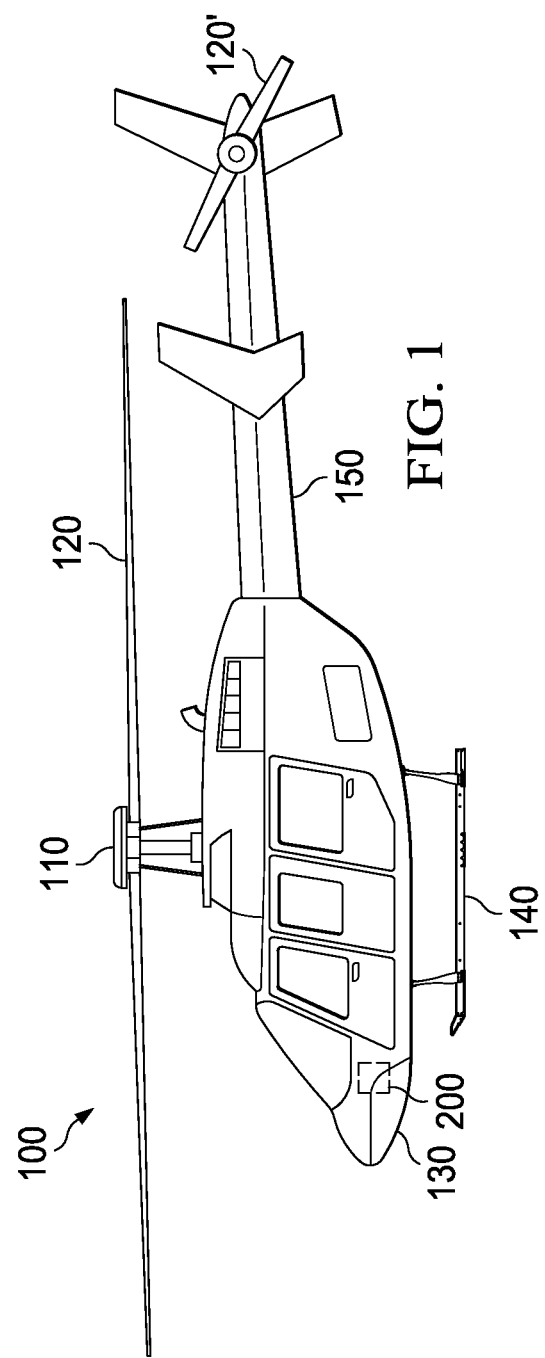
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Operation of an aircraft such as rotorcraft 100 may require that a pilot be able to see a variety of gauges that indicate different operating aspects of the aircraft. Thanks to advances in modern avionics, it is now possible to use electronic displays, such as liquid-crystal display (LCD) screens, to show gauge information instead of using traditional mechanical gauges. In some aircraft, touch screens may be used to allow aircraft personnel to manipulate information shown on the display.

Some information displayed in a cockpit, however, may be critical to operating the aircraft, and a display failure could jeopardize the pilot's ability to safely operate the aircraft. For example, if the aircraft is a military aircraft deployed in a forward area, a bullet could strike a standard display and render the entire display unusable.

Accordingly, some aircraft include redundant cockpit information displays so that if one display malfunctions, the pilot can still see the information on the other display. This approach, however, increases weight and cost by requiring installation of additional, redundant displays in the cockpit. In addition, cockpit space is a limited resource, and eliminating these redundant displays could free up space to display other information.

Accordingly, teachings of certain embodiments recognize the capability to provide a single display with internal redundancy capability. Teachings of certain embodiments recognize the capability of the single display to have prioritized content and to relocate content based on the prioritization in response to sensed damage to a portion of the display.

Figure 2:
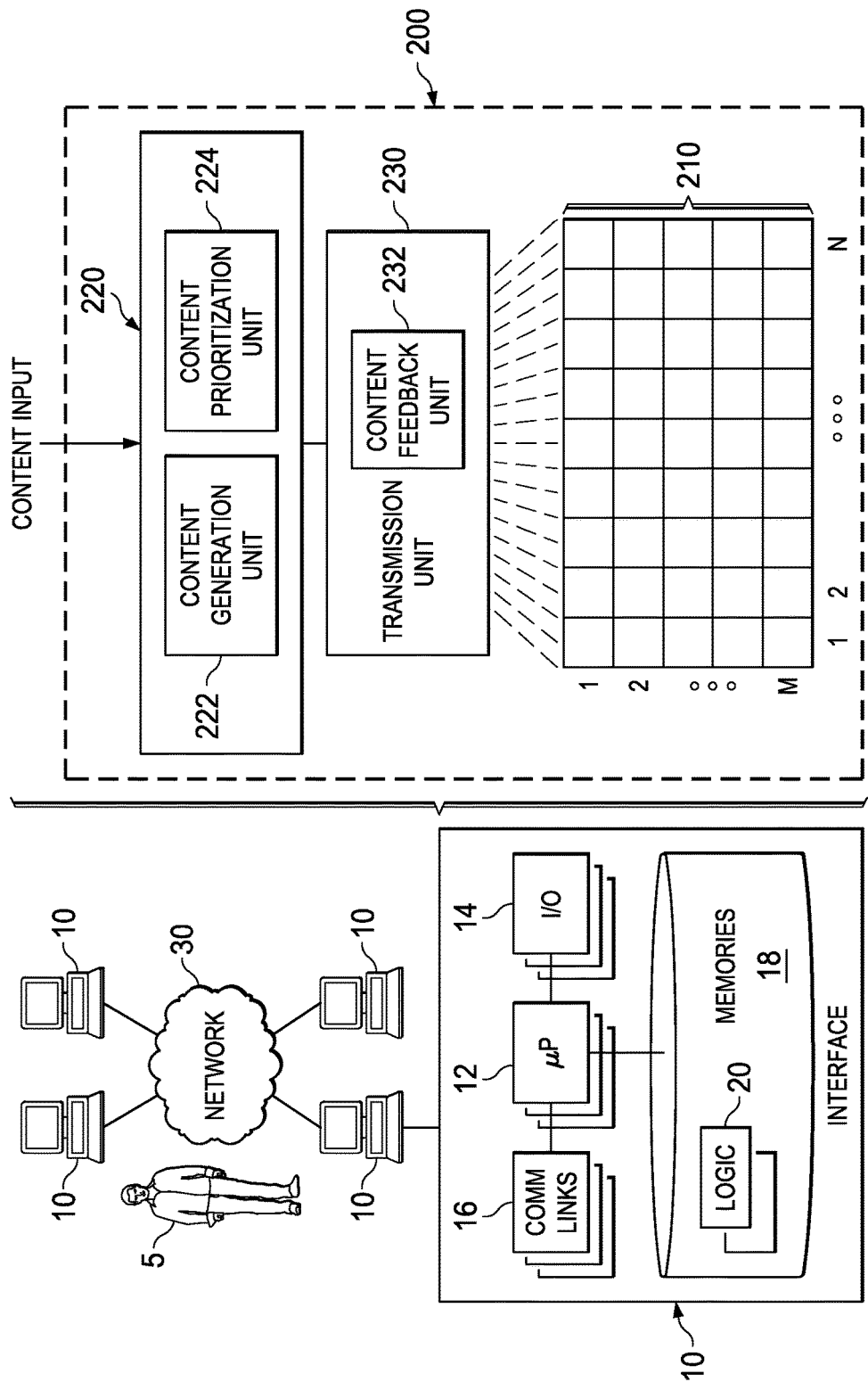
FIG. 2 shows a cockpit display system according to one example embodiment that may at least partially be disposed with an aircraft such as within the body of the rotorcraft of FIG. 1.

FIG. 2 shows a cockpit display system 200 that may at least partially be disposed with an aircraft such as within the body 130 of rotorcraft 100. Cockpit display system 200 features a display 210, a content system 220, and a transmission unit 230, all or some of which may be implemented by one or more computer systems 10 and accessible by one or more users 5. In operation, according to one example embodiment, content system 220 instructs transmission unit 230 to display information on display 210.

Users 5 may access cockpit display system 200 through computer systems 10. For example, in some embodiments, users 5 may provide flight control inputs that may be processed using a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example of FIG. 2, display 210 is comprised of a plurality of display tiles 212. These display tiles 210 together form a single, continuous display 210. From the perspective of the pilot or another user 5, the fact that display 210 is comprised of a plurality of display tiles 212 may not necessarily be apparent.

Display tiles 212 may be configured to operate independently such that a malfunction of one display tile 212 does not cause the other display tiles 212 to malfunction. If, for example, rotorcraft 100 were to receive gunfire and a bullet were to destroy one of the display tiles 212, the remaining display tiles 212 could continue to operate normally.

Figure 3A:
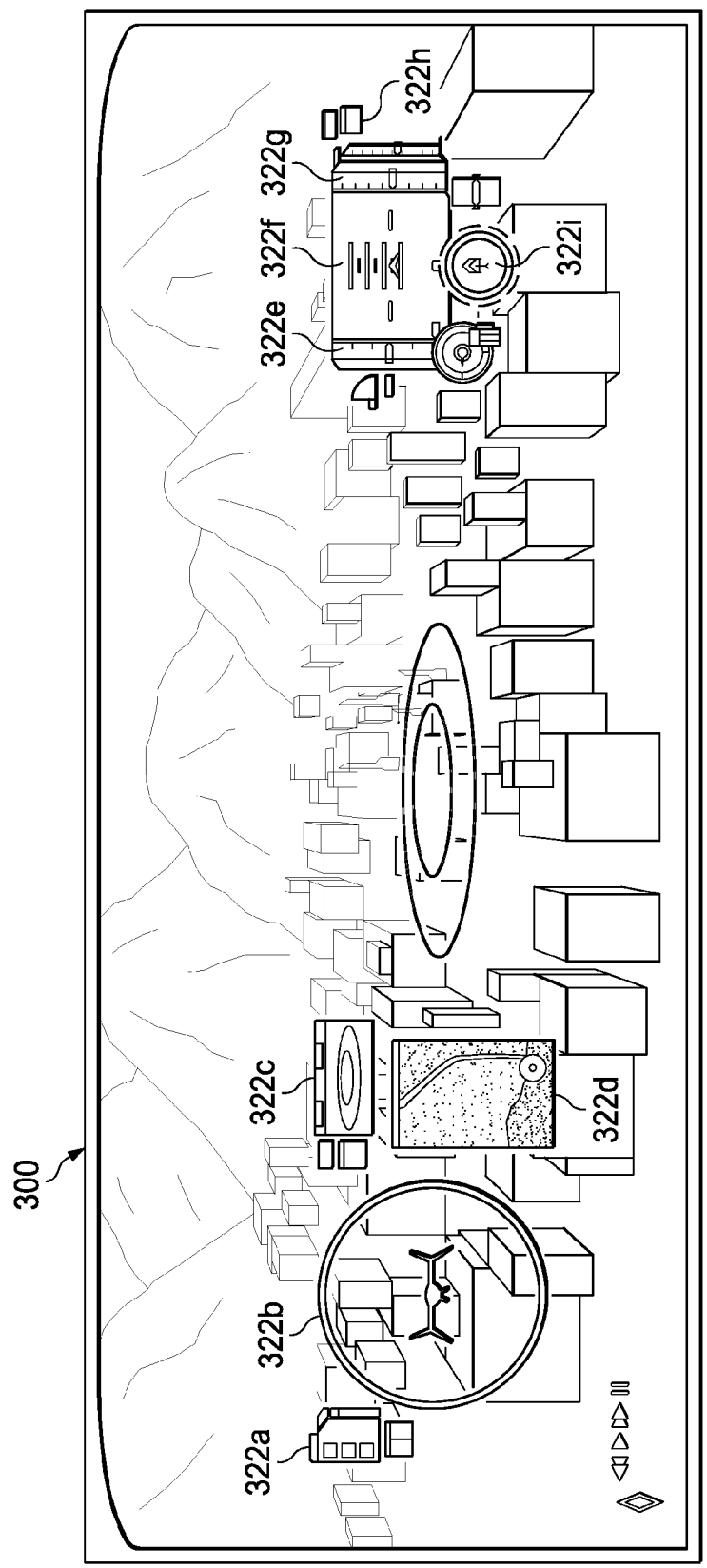
FIGS. 3A and 3B show example information portions displayed on a display that may represent one example of the display of the cockpit display system of FIG. 2.
Figure 3B:
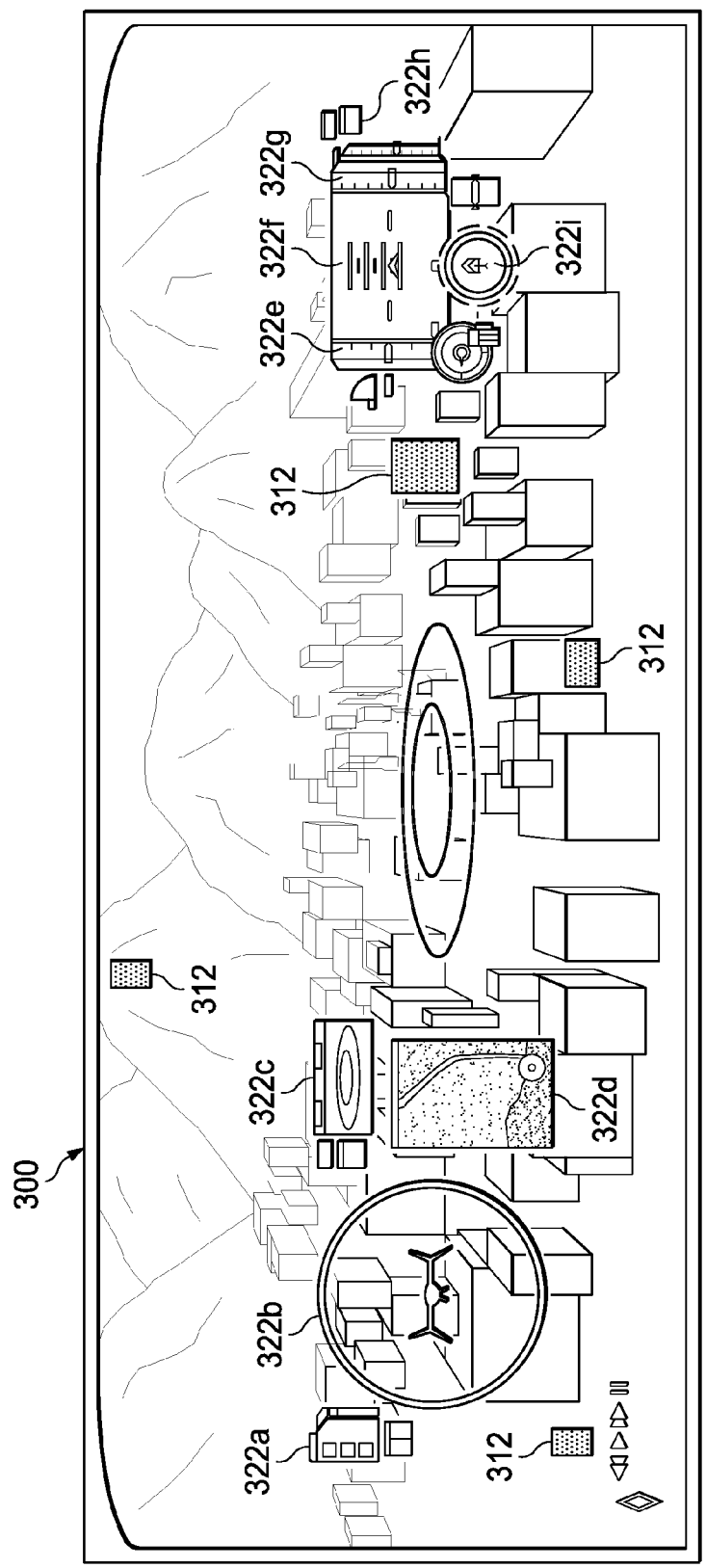

Display tiles 212 may be of any suitable size. Typically, display tiles 212 would be substantially larger than a pixel, and in fact, one display tile 212 may contain many pixels. On the other hand, display tiles 212 may be small enough that a malfunction of one display 212 does not substantially affect the overall usability of display 210. FIGS. 3A and 3B show an example display 300 according to one example embodiment. Display 300 may represent an example embodiment of the display 210 of FIG. 2. Display 300 may represent, for example, a single cockpit display large enough to be visible by both a pilot and a copilot situated in the cockpit of an aircraft such as rotorcraft 100.

In the example of FIG. 3A, display 300 is undamaged, with all display tiles working properly. In the example of FIG. 3B, however, several display tiles 312 are damaged. In particular, a single display tile 312 is damaged on the left side of display 300, a single display tile is damaged towards the upper center of display 300, two adjacent display tiles are damaged toward the lower center of display 300, and four adjacent display tiles are damaged toward the right of display 300.

Returning to the example of FIG. 2, content system 220 provides content for display on display 210. This content may be provided in the form of content instructions that instruct display 210 to display content comprising a plurality of information portions.

FIGS. 3A and 3B show example information portions 322a-322i. In these examples, information portions 322a-322i contain different pieces of information that are displayed for the pilot or copilot. Each information portion 322a-322i is displayed on one or more of the display tiles 312 of display 300.

Returning to the example of FIG. 2, content system 220 features a content generation unit 222 and a content prioritization unit 224. Content generation unit 222 generates the information portions for display on display 300. In one example embodiment, content generation unit 222 receives content input from outside sources (such as sensors or other equipment located on or off the aircraft) and converts the received content input into a format suitable for display on display 300. As one example, content generation unit 222 may receive airspeed information from an airspeed sensor, generate an information portion that contains the airspeed information, and provide instructions to display 300 for how to display the generated information portion.

Content prioritization unit 224 identifies display priorities among two or more information portions. Priorities among information portions may be used to determine where information portions should be displayed on display 300. In some embodiments, content prioritization unit 224 may identify, for each information portion, a prioritized list of locations where the information portion should be displayed on display 300. In some embodiments, content prioritization unit 224 may identify prioritization between different information portions such that, if two information portions are to be displayed in the same space on display 300, content prioritization unit 224 will instruct transmission unit 230 to only display the higher-priority information portion in that space and will move the lower-priority information portion to an alternative space.

This latter example might occur if a display tile that includes at least part of an information portion is destroyed. In the example of FIG. 3B, none of the nonfunctioning display tiles 312 interfere with information portions 322a-322i. In some scenarios, however, display tiles carrying information portions may be destroyed. In these scenarios teachings of certain embodiments recognize the capability to move the information portions to alternative display tiles that are still functioning.

Figure 3C:
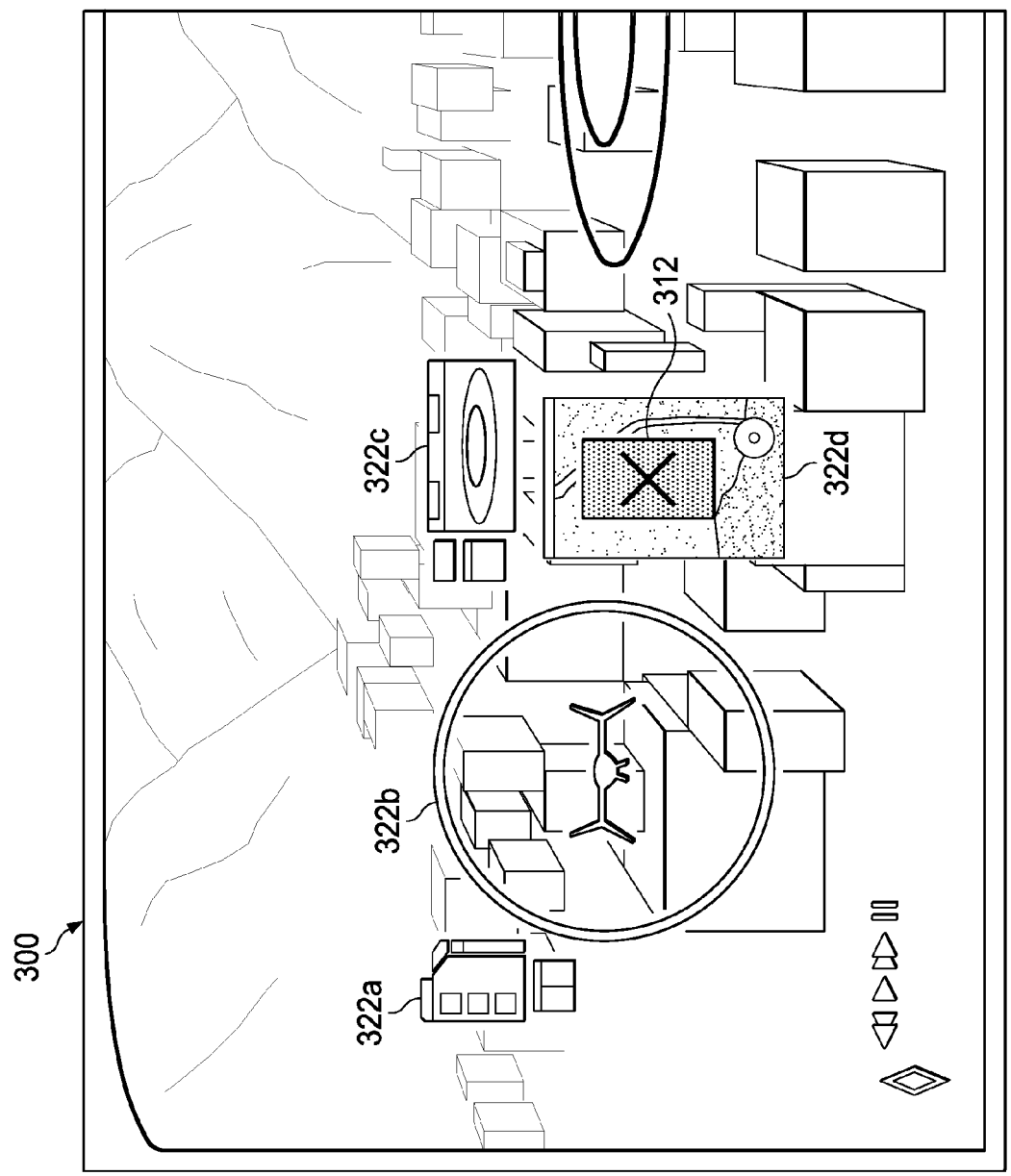
FIGS. 3C and 3D show an example scenario in which destruction of a display tile of the display of FIGS. 3A and 3B interferes with display of one of the information portions shown in FIGS. 3A and 3B.
Figure 3D:
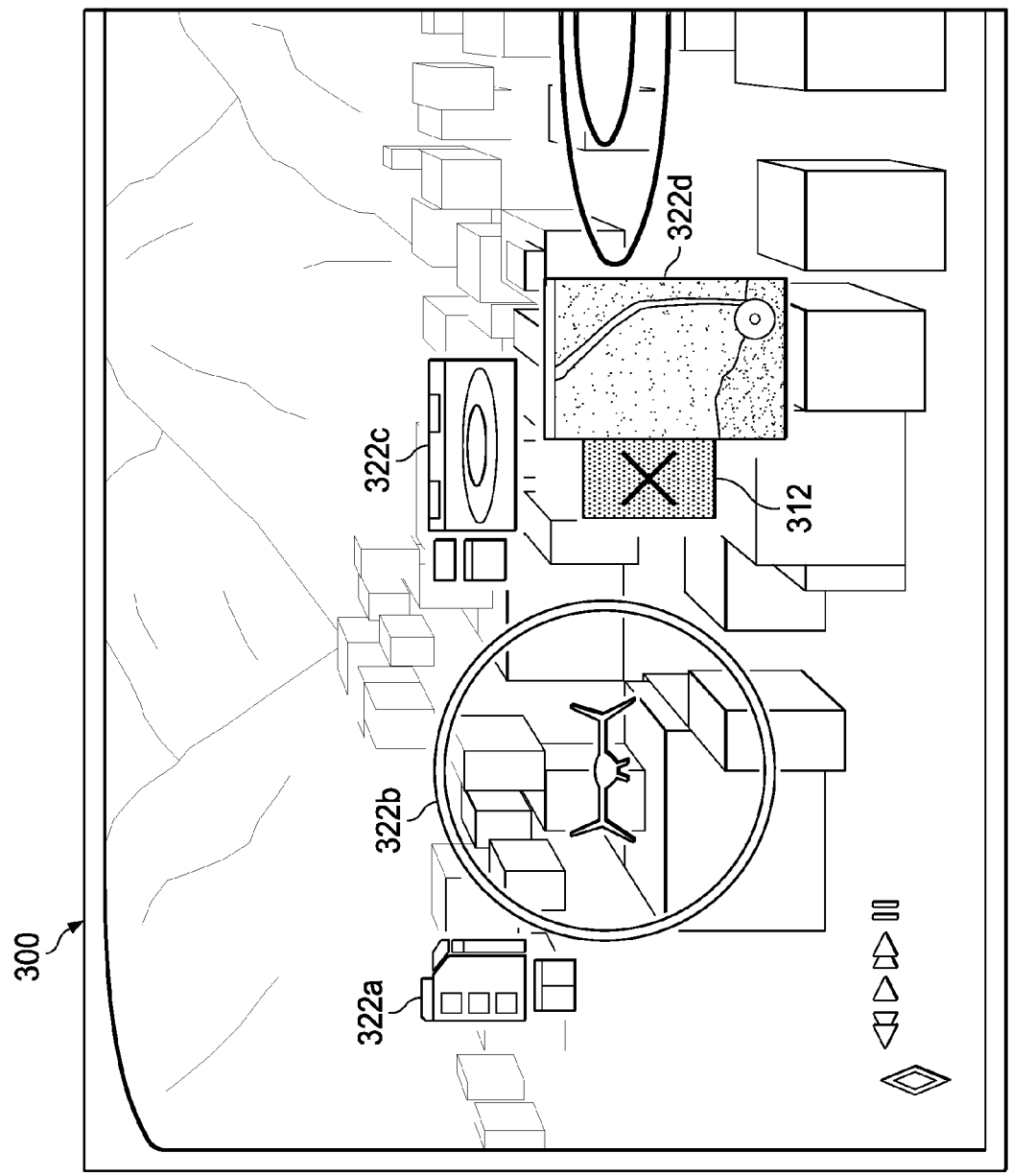

FIGS. 3C and 3D show an example scenario in which destruction of a display tile interferes with display of an information portion. In the example of FIG. 3C, a bullet has penetrated the corners of four display tiles 312 that were responsible for displaying information portion 322d. In FIG. 3D, information portion 322d is moved to the right of the four damaged display tiles 312 so that information portion 322d can be displayed in its entirety. The new location of information portion 322d may have been chosen, for example, based on information provided by content prioritization unit 224. For example, the location to the right of the four damaged display tiles 312 may have been the next-highest-priority location for information portion 322d.

If, in an alternative example, the next-highest-priority location for information portion 322d interfered with another information portion, content prioritization unit 224 would be responsible for resolving the conflict between the two information portions. For example, in FIG. 3D, the next-highest-priority location for information portion 322d may actually have been above the four damaged display tiles 312 where information portion 322c is located, but information portion 322c may have had a higher priority than information portion 322d; in this example, the location to the right of the four damaged display tiles 312 may actually represent the third-highest-priority location for information portion 322d, and content prioritization unit 224 may have chosen this location because the second-highest-priority location (above the four damaged display tiles 312) was occupied by a higher-priority information portion (information portion 322c).

Prioritization may be based on a variety of criteria. For example, prioritization may be based on how important each information portion is to flight safety. Thus, flight-critical information has a higher priority than non-flight-critical information. As another example, prioritization may be based on the goal of keeping information portions as close to their original locations as possible.

In some scenarios, a single display tile malfunction can trigger relocations of multiple information portions. For example, consider a display 300 that is large enough to serve as the primary display for both a pilot and a copilot. In this example, some information portions may be shown twice on display 300, in one location for the pilot and in another location for the copilot. If a malfunctioning display tile interrupts transmission of one information portion, content prioritization unit 224 may instruct transmission unit 230 to display the information portion in a new, single location visible to both the pilot and the copilot.

Returning to the example of FIG. 2, content system 220 may provide the content for display on display 210. However, as explained above, although display 210 may resemble a single, continuous display, display 210 may actually be comprised of a plurality of display tiles, each display tile being capable of independent operation such that a malfunction in one display tile does not render the other display tiles inoperable.

Accordingly, in some embodiments, transmission unit 230 may be responsible for converting the single content display stream provided by content system 220 into a plurality of display streams unique to each display tile of display 210. In one example embodiment, transmission unit 230 receives one display stream from content system 220, generates a plurality of sub-streams corresponding to each display tile, and transmits each sub-stream to its corresponding display tile.

In the example of FIG. 2, transmission unit 230 also features a display feedback unit 232. Display feedback unit 232 may be responsible for identifying the operational status of each display tile. For example, display feedback unit 232 may be able to alert content system 220 when a particular display tile of display 210 has stopped functioning. In this example, the alert may trigger content system 220 to move one or more information portions, as described above.

Display feedback unit 232 may identify the operational status of each display tile in a variety of ways. In one example embodiment, display feedback unit 232 may transmit a status signal to each display tile, and each display tile may be configured to transmit a feedback signal back to display feedback unit 232 in response to the status signal. In this example, display feedback unit 232 may presume that a display tile is not functioning properly if it does not return a feedback signal in response to the status signal.

In some embodiments, operational status of a display tile may be determined on a pixel by pixel basis. For example, display feedback unit 232 may determine the operational status of each pixel, and a display tile may deemed to be malfunctioning if a certain number or percentage of pixels within the display tile are malfunctioning.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 3 of 35 U.S.C. § 112 as it exists on the date of filing hereof unless the words "means for" or "step for" are explicitly used in the particular claim.

What is claimed is:

1. A rotorcraft, comprising:
   a body;
   a power train coupled to the body and comprising one or more power sources and a drive shaft coupled to the one or more power sources;
   a rotor system coupled to the power train and comprising a plurality of rotor blades; and
   a cockpit display system disposed at least partially within the body, the cockpit display system comprising:
   a plurality of display tiles together forming a single, continuous display screen;
   a content generation unit configured to generate content instructions that instruct the single, continuous display screen to display content comprising a plurality of information portions, each information portion of the plurality of information portions to be displayed on one or more display tiles of the plurality of display tiles;
   a display feedback unit configured to detect a malfunction of one or more malfunctioning display tiles of the plurality of display tiles; and
   a content prioritization unit configured to instruct the content generation unit to generate updated content instructions, the updated content instructions moving at least some of the information portions associated with the one or more malfunctioning display tiles to one or more display tiles that are not experiencing the malfunction;
   wherein the at least some of the information portions to be moved are to be moved to overlay some of but less than all of a relatively lower priority information portion.

2. The rotorcraft of claim 1, wherein the content instructions comprise instructions, for each information portion of the plurality of information portions, to display each specific information portion of the plurality of information portions on specific one or more display tiles of the plurality of display tiles.

3. The rotorcraft of claim 1, the cockpit display system further comprising a transmission unit configured to:
   receive the content instructions;
   generate, from the received content instructions, display tile instructions for each display tile of the plurality of display tiles, the display tile instructions identifying which information portion of the plurality of information portions are to be at least partially displayed on each display tile of the plurality of display tiles; and
   transmit each display tile instruction to a corresponding display tile of the plurality of display tiles.

4. The rotorcraft of claim 1, wherein the display feedback unit is configured to detect the malfunction by identifying an interruption in a feedback signal being received from a display tile of the plurality of display tiles.

5. The rotorcraft of claim 1, the content prioritization unit being configured to instruct the content generation unit to generate updated content instructions by:
   identifying an information portion associated with the one or more malfunctioning display tiles;
   consulting one or more prioritization rules associated with the identified information portion; and
   identifying a new location for the information portion associated with the one or more malfunctioning display tiles based on the one or more prioritization rules, the new location corresponding to the one or more display tiles that are not experiencing the malfunction that are referenced by the updated content instructions.

6. The rotorcraft of claim 5, wherein:
   the one or more prioritization rules identify a prioritized order of locations on the display screen where the identified information portion should be displayed; and
   identifying the new location for the information portion associated with the one or more malfunctioning display tiles based on the one or more prioritization rules comprises identifying subsequent one or more display tiles on the prioritized order of locations.

7. The rotorcraft of claim 5, wherein:
   the one or more prioritization rules identify a prioritized order of information portions;
   identifying the new location for the information portion associated with the one or more malfunctioning display tiles based on the one or more prioritization rules comprises:
   identifying a backup location for the information portion associated with the one or more malfunctioning display tiles;
   identifying a second information portion already being displayed at the backup location;
   determining whether the information portion associated with the one or more malfunctioning display tiles has a higher priority than the second information portion based on the one or more prioritization rules; and
   selecting the second location as the new location for the information portion associated with the one or more malfunctioning display tiles if the information portion associated with the one or more malfunctioning display tiles has a higher priority than the second information portion.

8. A cockpit display system, comprising:
   a plurality of display tiles together forming a single, continuous display screen;
   a content generation unit configured to generate content instructions that instruct the single, continuous display screen to display content comprising a plurality of information portions, each information portion of the plurality of information portions to be displayed on one or more display tiles of the plurality of display tiles;

a display feedback unit configured to detect a malfunction of one or more malfunctioning display tiles of the plurality of display tiles; and a content prioritization unit configured to instruct the content generation unit to generate updated content instructions, the updated content instructions moving at least some of the information portions associated with the one or more malfunctioning display tiles to one or more display tiles that are not experiencing the malfunction;

wherein the at least some of the information portions to be moved are to be moved to overlay some of but less than all of a relatively lower priority information portion.

9. The cockpit display system of claim 8, wherein the content instructions comprise instructions, for each information portion of the plurality of information portions, to display each specific information portion of the plurality of information portions on specific one or more display tiles of the plurality of display tiles.

10. The cockpit display system of claim 8, the cockpit display system further comprising a transmission unit configured to:
receive the content instructions;
generate, from the received content instructions, display tile instructions for each display tile of the plurality of display tiles, the display tile instructions identifying which information portion of the plurality of information portions are to be at least partially displayed on each display tile of the plurality of display tiles; and
transmit each display tile instruction to a corresponding display tile of the plurality of display tiles.

11. The cockpit display system of claim 8, wherein the display feedback unit is configured to detect the malfunction by identifying an interruption in a feedback signal being received from a display tile of the plurality of display tiles.

12. The cockpit display system of claim 8, the content prioritization unit being configured to instruct the content generation unit to generate updated content instructions by:
identifying an information portion associated with the one or more malfunctioning display tiles;
consulting one or more prioritization rules associated with the identified information portion; and
identifying a new location for the information portion associated with the one or more malfunctioning display tiles based on the one or more prioritization rules, the new location corresponding to the one or more display tiles that are not experiencing the malfunction that are referenced by the updated content instructions.

13. The cockpit display system of claim 12, wherein:
the one or more prioritization rules identify a prioritized order of locations on the display screen where the identified information portion should be displayed; and
identifying the new location for the information portion associated with the one or more malfunctioning display tiles based on the one or more prioritization rules comprises identifying subsequent one or more display tiles on the prioritized order of locations.

14. The cockpit display system of claim 12, wherein:
the one or more prioritization rules identify a prioritized order of information portions;

identifying the new location for the information portion associated with the one or more malfunctioning display tiles based on the one or more prioritization rules comprises:
identifying a backup location for the information portion associated with the one or more malfunctioning display tiles;
identifying a second information portion already being displayed at the backup location;
determining whether the information portion associated with the one or more malfunctioning display tiles has a higher priority than the second information portion based on the one or more prioritization rules; and
selecting the second location as the new location for the information portion associated with the one or more malfunctioning display tiles if the information portion associated with the one or more malfunctioning display tiles has a higher priority than the second information portion.

15. A method of displaying information in the cockpit of an aircraft, comprising:
generating content instructions that instruct a single, continuous display screen to display content comprising a plurality of information portions, the single, continuous display screen being comprised of a plurality of display tiles, each information portion of the plurality of information portions to be displayed on one or more display tiles of the plurality of display tiles;
detecting a malfunction of one or more malfunctioning display tiles of the plurality of display tiles; and
generating updated content instructions, the updated content instructions moving at least some of the information portions associated with the one or more malfunctioning display tiles to one or more display tiles that are not experiencing the malfunction; and
wherein the at least some of the information portions to be moved are to be moved to overlay some of but less than all of a relatively lower priority information portion.

16. The method of claim 15, wherein the content instructions comprise instructions, for each information portion of the plurality of information portions, to display each specific information portion of the plurality of information portions on specific one or more display tiles of the plurality of display tiles.

17. The method of claim 15, wherein detecting the malfunction comprises identifying an interruption in a feedback signal being received from a display tile of the plurality of display tiles.

18. The method of claim 15, wherein generating the updated content instructions comprises:
identifying an information portion associated with the one or more malfunctioning display tiles;
consulting one or more prioritization rules associated with the identified information portion; and
identifying a new location for the information portion associated with the one or more malfunctioning display tiles based on the one or more prioritization rules, the new location corresponding to the one or more display tiles that are not experiencing the malfunction that are referenced by the updated content instructions.

19. The method of claim 18, wherein:
the one or more prioritization rules identify a prioritized order of locations on the display screen where the identified information portion should be displayed; and
identifying the new location for the information portion associated with the one or more malfunctioning display tiles based on the one or more prioritization rules comprises identifying subsequent one or more display tiles on the prioritized order of locations.

20. The method of claim 18, wherein:

the one or more prioritization rules identify a prioritized order of information portions;

identifying the new location for the information portion associated with the one or more malfunctioning display tiles based on the one or more prioritization rules comprises:

identifying a backup location for the information portion associated with the one or more malfunctioning display tiles;

identifying a second information portion already being displayed at the backup location;

determining whether the information portion associated with the one or more malfunctioning display tiles has a higher priority than the second information portion based on the one or more prioritization rules; and selecting the second location as the new location for the information portion associated with the one or more malfunctioning display tiles if the information portion associated with the one or more malfunctioning display tiles has a higher priority than the second information portion.

* * * * *